United States Patent [19]

Suzuki et al.

[11] Patent Number: 4,498,750
[45] Date of Patent: Feb. 12, 1985

[54] LIGHT SHIELDING DEVICE IN SINGLE LENS REFLEX CAMERA

[75] Inventors: Masayuki Suzuki; Masayoshi Yamamichi, both of Kanagawa; Tsunemasa Ohara, Tokyo, all of Japan

[73] Assignee: Canon Kabushiki Kaisha, Tokyo, Japan

[21] Appl. No.: 436,381

[22] Filed: Oct. 25, 1982

[30] Foreign Application Priority Data

Oct. 30, 1981 [JP] Japan ................. 56-162145

[51] Int. Cl.³ ............................................ G03B 19/12
[52] U.S. Cl. ................................... 354/154; 354/479
[58] Field of Search ..................................... 354/53–56, 354/152, 153, 154, 479

[56] References Cited

U.S. PATENT DOCUMENTS 3,280,714 10/1966 Gunther et al. ...................... 354/55
3,332,331 7/1967 Mandler ................................ 354/55
3,540,364 11/1970 Ono ....................................... 354/55
4,342,508 8/1982 Haraguchi ........................ 354/55 X Primary Examiner—John Gonzales
Attorney, Agent, or Firm—Toren, McGeady and Stanger

[57] ABSTRACT

A reflex mirror for reflecting light from an objective lens to a penta prism is provided with a light-permeable portion for conducting part of the light to behind the reflex mirror and with a shutter plate for shielding this light-permeable portion. When the reflex mirror reaches an exposing position after being moved from a viewing position, the shutter plate comes into engagement with a member and it takes a light-shielding position. This member is made adjustable in position, thereby enabling achievement of an accurate light-shielding position of the permeable portion by the shutter plate when the reflex mirror is in the exposing position.

6 Claims, 4 Drawing Figures

LIGHT SHIELDING DEVICE IN SINGLE LENS REFLEX CAMERA

BACKGROUND OF THE INVENTION

1. Field of the Invention

This invention relates to single lens reflex cameras in which a reflex mirror has a light-permeable portion for splitting part of light coming from an object to be photographed and entering through the objective lens into the light meter, and more particularly to a light shielding device for the aforesaid light-permeable portion.

2. Description of the Prior Art

In the past it has been known to provide a single lens reflex camera in which the reflex mirror for reflecting light fron the objective lens to the penta prism is provided with a light-permeable portion so that when the reflex mirror is in the viewing position, light from the light-permeable portion is received by a light sensor for automatic detection of the distance from the camera to the object and derivation of a light value based on which the exposure operation of the camera is determined. Also in such camera it is known to cover the light-permeable portion by a shutter plate when the reflex mirror moves to the exposing position, as is, for example, disclosed in Japanese Laid-Open Patent No. Sho 56-12626 (published on Feb. 7, 1981).

Incidentally, in such camera, use is made of a stopper on which the shutter plate abuts when the reflex mirror has moved to the exposing position. In the case where the opening and closing operation of the shutter plate is controlled by this stopper, certain problems arise.

When the reflex mirror is moved from the viewing to the exposing position by a mirror operating mechanism, the upper dead point of the reflex mirror (the nearest point of the mirror to the exposing position) differs from camera to camera because of the existence of variations in size and relative position of parts of the mirror operating mechanism. In some of the items, therefore, it happens that with the reflex mirror is moved to the exposing position, the shutter plate cannot perfectly cover the light-permeable portion. Because of this, there exists a drawback that during the exposure operation of the camera, light from the finder eye-piece enters through the light-permeable portion to reach the film surface with the result that incorrect exposure occurs.

Also in case the opening and closing of the shutter plate is controlled by a rigid stopper, since the stopper absorbs the kinetic energy of the reflex mirror in a very short time as it moves from the viewing position to the exposing position, the kinetic energy is converted to sonic energy, heat energy and work energy, and in large proportion to sonic energy and work energy. This phenomena, causes the sound at the time of collision to become very loud, and the stopper and the shutter plate are substantially worn.

SUMMARY OF THE INVENTION

With the foregoing in mind, it is an object of the present invention to provide a light shielding device in a single lens reflex camera capable of shutting out the light-permeable portion of the reflex mirror when the reflex mirror has moved to the exposing position.

Another object of the present invention is to provide a light shielding device in a single lens reflex camera operating with as little noise as possible and with minimum abrasion of the constituent parts.

These and other objects and features of the present invention will become apparent from the following description of embodiments thereof taken in connection with the accompanying drawings.

DETAILED DESCRIPTION OF THE PREFERRED EMBODIMENTS

Figure 1:
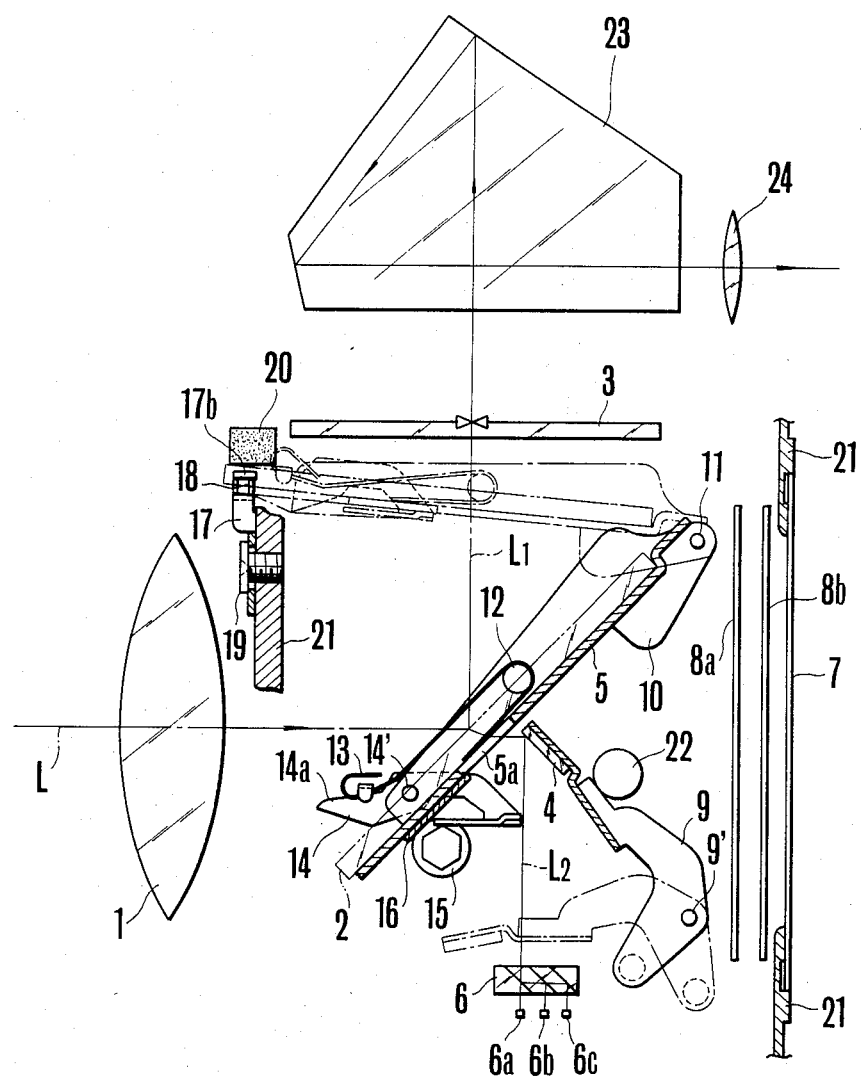
FIG. 1 is an elevational section view of an embodiment of a light shielding device in a single lens reflex camera according to the present invention.

Referring now to the drawings, the present invention is shown as comprising an objective lens 1 and a main mirror 2 for reflecting light entering through the objective lens 1 to a focusing screen 3. At the back surface of this main mirror 2 there is shown a back plate 5 provided with an apertured portion 5a for conducting part of that light L to an auxiliary mirror 4. A split prism 6 receives the reflected light L2 from the auxiliary mirror 4 for splitting it into three parts. Positioned adjacent this split prism 6 are three rangefinding elements 6a, 6b and 6c with the element 6b at an optically conjugate point to a film 7 and with the other two 6a and 6c at almost equal distances to each other from that point forwardly and rearwardly respectively. It is to be noted that the focus detecting device using such an arrangement of light-sensitive elements 6a, 6b and 6c is disclosed, for example, in Japanese Laid-Open Patent No. Sho 55-155308 (published on Dec. 3, 1980). 8a and 8b are respectively leading and trailing curtains of a focal plane shutter known to those skilled in the art; 9 is an auxiliary mirror support plate fixedly carrying the auxiliary mirror 4, this support plate 9 being pivotally mounted about a shaft 9'; 10 is a main mirror arm drivenly connected to a mirror drive member (not shown), this main mirror arm 10 being pivotally held about a shaft 11; 12 is a shaft fixed to the main mirror arm 10 and holding a spring 13; and 14 is a shutter plate pivotally supported through a shaft 14' mounted to the main mirror arm 10, this shutter plate 14 allowing light past the apertured portion 5a to be incident on the auxiliary mirror 4 during viewing, and shielding the apertured portion 5a during film exposure. The spring 13 urges the shutter plate 14 in a direction to open the apertured portion 5a (clockwise direction as viewed in the drawing), and in the illustrated position, the light L is conducted through the apertured portion 5a to the auxiliary mirror 4. 15 is an eccentric pin for restricting the position of the main mirror 2 and 16 is a buffer rubber for softening shock when the main mirror 2 is rapidly returned to the viewing position by a quick return mechanism (not shown) after exposure has been completed.

Figure 2:
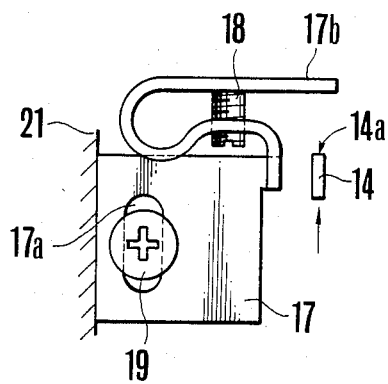
FIG. 2 is a plan view illustrating the details of the adjusting plate of FIG. 1.

As illustrated also in FIG. 2 in greater detail, 17 is an adjusting plate having an engaging portion 17b on which an end portion 14a of the shutter plate 14 abuts when the main mirror 2 has moved to the position illustrated by dashed lines in FIG. 1. The adjusting plate 17 is fixedly secured to the camera housing by a screw fastener 19 and its fixedly secured position is made changeable through an elongated slot 17a so that when screw 19 is loosened, the plate 17 is movable vertically as viewed in the drawings. The engaging portion 17b acts on the end portion 14a of the shutter plate 14 to turn the latter about the shaft 14' in a counterclockwise direction. In order to absorb a collision force when the end portion 14a abuts thereupon, the engagement portion 17b is formed to an almost similar shape to the letter "U" so that a springing property is produced. Though the adjusting plate 17 and the end portion 17b are shown as formed to be integral, it is, of course, possible that they may be formed separately and assembled to a unit by suitable fastening means. 18 is a screw for giving an initial tension to the tip of the engagement portion 17b. The screw 18 connects across both the arms of the curved section of the engaging portion 17b with the distance therebetween being adjusted so as to exert tension on the tip of the engaging portion 17b in the illustrated position of FIG. 2.

Figure 3:
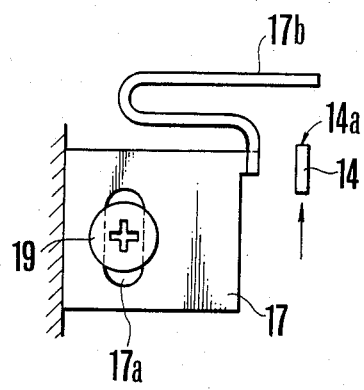
FIGS. 3 and 4 are plan view of other examples of the adjusting plate.
Figure 4:
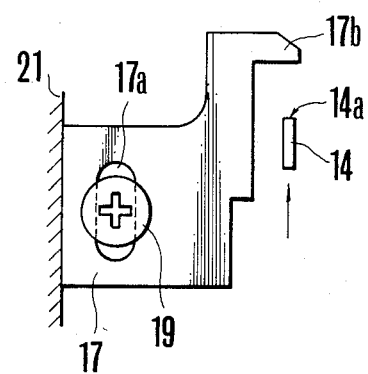

Also FIG. 3 illustrates another practical example of the adjusting plate 17 which is different from that of FIG. 2 in that there is no screw 18. Therefore, in this example, no initial tension is given to the engaging portion 17b in the illustrated position. Further FIG. 4 illustrates still another practical example of the adjusting plate 17 where the engaging portion 17b is in a fixed form.

Turning again to FIG. 1, 20 is a buffering member of soft material for absorbing the shock in cooperation with the adjusting plate 17 when the main mirror moves upwards; 21 is a portion of the camera housing; 22 is an eccentric pin for adjusting the position of the auxiliary mirror 4; 23 is a penta prism; and 24 is an eye-piece.

The operation of the device of such construction is as follows: in FIG. 1, when viewing an image of an object to be photographed through the penta prism 23, the main mirror 2 and auxiliary mirror 4 lie in their positions illustrated by the solid lines where a portion L2 of the light bundle L entering through the objective lens 1 passes through the apertured portion 5a and is reflected by the auxiliary mirror to the split prism 6, whereby the object distance (in-focus condition) is determined by the elements 6a, 6b and 6c, while the light bundle L1 reflected by the main mirror 2 can be observed through the focusing screen 3 and prism 23. After this observation, when a shutter button (not shown) is pushed down, the main mirror 2 moves about the pivot shaft 11 to the exposure position illustrated by the dashed lines, and the auxiliary mirror 4 also moves about the pivot shaft 9' to the position illustrated by the dashed lines, so that the optical path to the film 7 is unobstructed. And, when the main mirror 2 is in the exposure position illustrated by the dashed lines, the end portion 14a of the shutter plate 14 supported on the shaft 14' which is in unitary relationship to the main mirror 2 abuts on the engagement portion 17b of the adjusting plate 17, whereby the shutter plate 14 is turned in the counterclockwise direction against the bias force of the spring 13 to shut out the apertured edge 5a. By the way, the adjusting plate 17 in the present embodiment has the elongated slot 17a as illustrated in FIGS. 2 to 4, so that the position of the adjusting plate 17 relative to the camera housing can be freely varied in the vertical direction. With this, the amount of rotation of the shutter plate 14 at the time when the mirror 2 has reached the exposing position illustrated by the dashed lines can be adjusted by adjusting the timing of the contact of the engaging portion 17b with the end portion 14a of the shutter plate 14. Therefore, it is possible to shield the apertured portion 5a completely by the shutter plate 14 when the main mirror 2 has reached the exposure position illustrated by the dashed lines. Also since, in the embodiments illustrated in FIGS. 2 and 3, the engagement portion 17b is formed by a resilient material, the shock resulting from the collision of the engagement portion 17b and the shutter plate 14 is absorbed, whereby abrasion and damage of the parts are prevented, and the shock at the time of collision is substantially reduced. Thus, improved camera operation is facilitated and blurred images can be avoided. Further, the embodiment illustrated in FIG. 2 combines the engagement portion 17b of resilient material with the initial tension adjusting member or screw 18. According to this embodiment, therefore, the minute plastic deformation of the resilient member is absorbed by the action of the screw 18. In addition thereto, even the rigidity of this resilient member too can be adjusted, thereby giving advantages that even when shocks are repeatedly applied to this resilient member, the stopped position thereof is left unchanged, and the collision force can be largely reduced.

Though the present invention has been described in connection with a single lens reflex camera in which the transmitting light from the main mirror 2 is used in detecting the distance from the camera to the object, the present invention is applicable to, for example, a single lens reflex camera in which the transmitting light from the main mirror is used in controlling the exposure.

As has been described in greater detail above, according to the present invention, the light-permeable portion of the reflex mirror can be perfectly shielded when the aforesaid mirror has reached the exposure position so that occurrence of an incorrect exposure is prevented which would otherwise result due to light leakage from the finder to the film during the exposure operation of the camera.

While specific embodiments of the invention have been shown and described in detail to illustrate the application of the inventive principles, it will be understood that the invention may be embodied otherwise without departing from such principles.

What we claim:

1. A light shielding device for a single lens reflex camera including a reflex mirror provided with a light transmitting portion, comprising:
    (a) means for covering said light transmitting portion when said reflex mirror is moved from a viewing position to an exposure position; and
    (b) means for controlling said covering means, said controlling means being arranged to contact with said covering means at a point during the movement of said reflex mirror from the viewing position to the exposure position and then to control the operation of said covering means, being able of adjusting the timing of contact with said covering means, and being resiliently supported to absorb shock at the time when said controlling means strikes said covering means, with the initial tensile force of that resiliency being made adjustable independently of the timing adjustment of the contact.

2. A device according to claim 1 wherein said controlling means has first adjusting means for adjusting the timing of contact and second adjusting means for adjusting the initial tensile force.

3. A device according to claim 2 wherein said controlling means is fixedly secured to the camera body through said first adjusting means.

4. A device according to claim 3 wherein said controlling means has an end portion fixed to the camera body and another end portion engageable with said covering means with an intervening portion therebetween bent to a generally U-shape.

5. A device according to claim 4 wherein said second adjusting means adjusts the length of the bent portion of said controlling means so that the initial tensile force is changed.

6. A mirror assembly for a single lens reflex camera comprising:

a mirror member operative to be moved between a viewing position and a film exposure position, said mirror member including a light reflective portion and a light transmitting portion for allowing passage of light through said mirror member;

covering means operatively associated with said mirror member movable between a position covering said light transmitting portion when said mirror member is in said film exposure position and a position uncovering said light transmitting portion when said mirror member is in said viewing position; and means for controlling movement of said covering means for moving said covering means between said covering position and said uncovering position, said controlling means comprising abutting means coming into contact with said covering means when said mirror member moves from said viewing position to said film exposure position to effect movement of said covering means from said uncovering position to said covering position and adjusting means for adjusting the timing of contact between said abutting means and said covering means;

said abutting means including resiliency producing means for resiliently absorbing shock when said covering means contacts said abutting means, with the resiliency of said resiliency producing means being adjustable independently of the timing of contact adjustment between said covering means and said abutting means.

* * * * *